United States Patent [19]
Nesamoney et al.

[11] Patent Number: 6,044,374
[45] Date of Patent: *Mar. 28, 2000

[54] METHOD AND APPARATUS FOR SHARING METADATA BETWEEN MULTIPLE DATA MARTS THROUGH OBJECT REFERENCES

[75] Inventors: Diaz Nesamoney, San Francisco; Parth S. Chandra, Palo Alto; Sanjeev Gupta, Sunnyvale; Girish Pancha, San Francisco; Jeffrey B. Taylor, Santa Clara; M S Kiumarse Zamanian, San Francisco, all of Calif.

[73] Assignee: Informatica Corporation, Menlo Park, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/970,950

[22] Filed: Nov. 14, 1997

[51] Int. Cl.[7] .................................................... G06F 17/30
[52] U.S. Cl. ................. 707/10; 707/1; 707/103; 707/200; 707/201
[58] Field of Search .................. 707/1, 10, 103, 707/200, 201

[56] References Cited

U.S. PATENT DOCUMENTS

| | | | |
|---|---|---|---|
| 5,410,688 | 4/1995 | Williams et al. | 395/600 |
| 5,655,101 | 8/1997 | O'Farrell et al. | 395/475 |
| 5,675,785 | 10/1997 | Hall et al. | 707/102 |
| 5,721,911 | 2/1998 | Ha et al. | 395/611 |
| 5,781,911 | 7/1998 | Young et al. | 707/201 |
| 5,799,310 | 8/1998 | Anderson et al. | 707/102 |
| 5,857,197 | 1/1999 | Mullins | 707/103 |

OTHER PUBLICATIONS

Curley, K. et al. "The Rationale for Developing a Corporate Data Warehouse and the Development of a Model for Sharing Data in a Data Warehouse Environment." OOIS '95. 1995 International Conference on Object Oriented Information Systems Proceedings, Proceedings of 1995, International Conference on Object Oriented Information Systems, Dublin, Ireland, Dec. 18–20, 1995, pp. 351–366, XP002074808, ISBN 3–540–76010–5, 1996, Berlin, Germany, Springer–Verlag, Germany.

Informatica Press Releases, "Informatica Unveils Architecture For Networking Multiple Data Marts Into An Enterprise–Wide Data Warehouse", http://www.informatica.com/edm_–_082697.html, pp. 1–4, Aug. 26, 1997.

Informatica Press Releases, "Informatica Delivers Industry'First Synchronized Data Marts With Newest Version of Powermart Suite", http://www.informatica.com/syndata_–_052798.html, pp. 1–4, May 27, 1997.

*Primary Examiner*—Wayne Amsbury
*Assistant Examiner*—William Trinh
*Attorney, Agent, or Firm*—Wagner, Murabito & Hao LLP

[57] ABSTRACT

A method and system for accessing and sharing metadata amongst a number of data marts through the use of object referencing. A global repository is created. Shared folders containing metadata is contained in the global repository. Any number of data marts can be linked to the global repository. Stored within the folders of the linked data marts are references pointing to certain metadata stored in the shared folders of the global repository. Multiple data marts can reference the same metadata in the global repository. Thereby, the same metadata can be accessed, used, and shared by multiple users across different data marts, provided that they have been granted the proper authority. New metadata can be promoted from a linked data mart into the global repository so that it can be shared, and updates to shared metadata can be automatically propagated to all users referencing that metadata.

12 Claims, 12 Drawing Sheets

METHOD AND APPARATUS FOR SHARING METADATA BETWEEN MULTIPLE DATA MARTS THROUGH OBJECT REFERENCES

FIELD OF THE INVENTION

The present invention relates to a method and apparatus for sharing metadata between multiple data marts through the use of object references.

BACKGROUND OF THE INVENTION

Due to the increased amounts of data being stored and processed today, operational databases are constructed, categorized, and formatted in a manner conducive for maximum throughput, access time, and storage capacity. Unfortunately, the raw data found in these operational databases often exist as rows and columns of numbers and code which appears bewildering and incomprehensible to business analysts and decision makers. Furthermore, the scope and vastness of the raw data stored in modern databases renders it harder to analyze. Hence, applications were developed in an effort to help interpret, analyze, and compile the data so that it may be readily and easily understood by a business analyst. This is accomplished by mapping, sorting, and summarizing the raw data before it is presented for display. Thereby, individuals can now interpret the data and make key decisions based thereon.

Extracting raw data from one or more operational databases and transforming it into useful information is the function of data "warehouses." In a data warehouse, the data is structured to satisfy decision support roles rather than operational needs. Before the data is loaded into the data warehouse, the corresponding source data from an operational database is filtered to remove extraneous and erroneous records; cryptic and conflicting codes are resolved; raw data is translated into something more meaningful; and summary data that is useful for decision support, trend analysis or other end-user needs is precalculated. In the end, the data warehouse is comprised of an analytical database containing information useful for decision support. With data warehouses, the transformed, understandable information is retained at the disposal for key decision makers.

In the past, data warehouses were relatively small and easily managed. However, as operational databases grew to meet increased business demands, their data warehouses grew correspondingly. And contributing to the growth in the size of individual data warehouses was the fact that many diverse functions and departments of a business, such as finance, payroll, marketing, sales, inventory control, etc., all desired to gain from the benefits conferred by a data warehouse. Eventually, implementing a single, universal data warehouse for servicing all the needs of a corporation became too unwieldy and cumbersome. Maintaining, updating, and accessing data in such a grand and centralized data warehousing scheme became overly complex, time consuming, and expensive.

In an effort to ameliorate this problem, data "marts" were created. Data marts are similar to data warehouses, except that data marts usually contain only a subset of corporate data which is directed towards a single aspect of that business (e.g., a separate finance data mart, sales data mart, human resources data mart, etc.). The substitution of numerous, smaller, distributed data marts in place of much larger data warehouses, provides increased autonomy and flexibility. Furthermore, individual data marts can be tailored to suit the needs of a particular department.

However, the users of different data marts within a business often have, or develop over time, the need to share useful data or metadata (i.e., data describing the content and structure of other data) across their departmental boundaries. If the data marts deployed by these various departments are completely disjoint, each group will subsequently be forced to recreate the metadata that it needs from another group's data mart. In turn, this will lead to duplication of effort and problems coordinating the usage of shared metadata. For example, the marketing department of a retail store may have developed a series of relational tables for capturing certain customer profiles for direct mail marketing. The sales department of the same store may also want to use similar profiles for analyzing buying trends based on various customer data. Furthermore, the sales department may have created a number of algorithms for forecasting revenues based on specific promotional advertisements. The store's marketing department may want to use these same algorithms for enhancing their advertisement strategies. From this example, it is clear that sharing of metadata between different departments of a business would save time and effort in addition to promoting better coordination of creation and usage of reusable metadata. The sharing of metadata becomes even more advantageous for global organizations with dispersed teams trying to solve similar or related data analysis problems using an integrated computing approach. In such organizations, coordination of efforts relies heavily on network computing and effective use of knowledge and resources developed by different departments, groups, or teams. Indeed, the ability to share and reuse metadata within and across data marts becomes extremely important as the data marts become more interdependent and various departments and groups attempt to collaborate more closely and effectively.

Thus, there is a need for some method and apparatus which provides the flexibility and autonomy of the multiple data mart approach, yet also has the capability of sharing and reusing metadata. The present invention provides an novel solution which preserves the autonomy, flexibility, and ease of management associated with multiple data marts while also providing the ability of sharing metadata so that duplication is minimized and changes are captured and propagated efficiently, seamlessly, and transparently to the users. The present invention incorporates the best features of both data warehouse and data mart applications in terms of independence and sharing of metadata into one integrated solution.

SUMMARY OF THE INVENTION

The present invention pertains to a method and system for accessing and sharing metadata amongst a number of data marts through the use of object referencing. Initially, a global repository is created. The purpose of the global repository is to store all of the matdata objects (e.g., sources, targets, transformations, etc.) that have been designated to be shared. These objects are stored in shared folders within the global repository. Any number of data marts can be linked to the global repository. The linking enables those data marts the ability to gain access to the objects stored in the global repository. But in order for individuals to gain access, they must first have user accounts set up with the proper read or read/write privileges. Given proper authorization, the metadata is accessed through the use of an object reference. Basically, a reference points to the object stored in the global repository. Rather than storing an object directly in each of the data marts desiring to access that particular object, a reference to that object is stored instead in those data marts. By using multiple references, the same object can be accessed, used, and shared by multiple users across many different data marts. This eliminates having redundant duplication and also allows objects to be shared and reused by any number of users. In the currently preferred embodiment, new objects can be created and promoted from a data mart into the global repository so that it can be shared. Furthermore, updates to shared objects can be automatically and transparently propagated to all users referencing that object.

BRIEF DESCRIPTION OF THE DRAWINGS

The operation of this invention can be best visualized by reference to the following drawings.

DETAILED DESCRIPTION

A method and apparatus for sharing metadata between multiple data marts through the use of object references is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. Furthermore, the terms "data warehouse" and "data mart" are used interchangeably.

Figure 1:
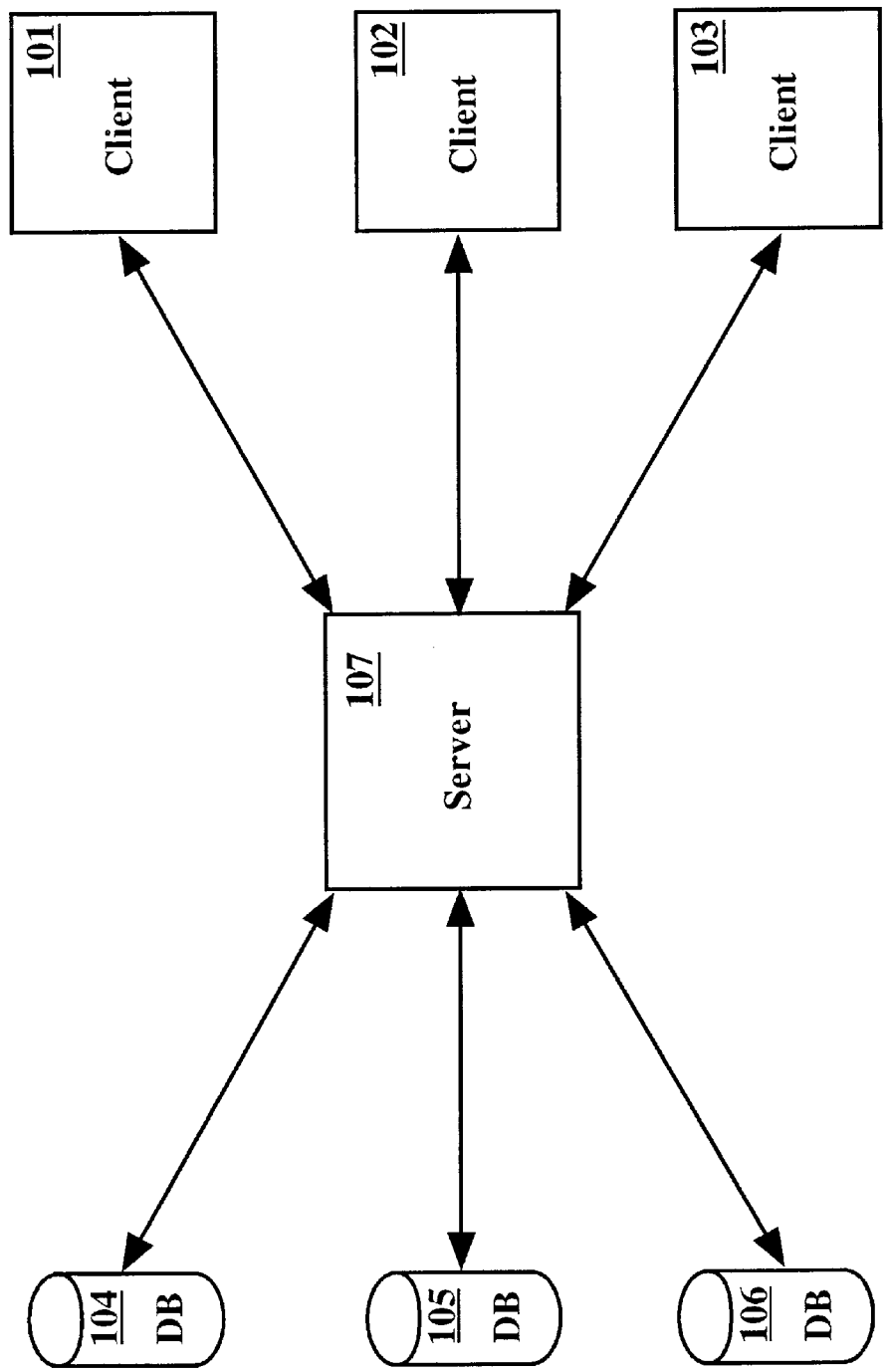
FIG. 1 shows a block diagram of a client/server system upon which the present invention may be practiced is shown.

Referring now to FIG. 1, a block diagram of a client/server system upon which the present invention may be practiced is shown. The system may incorporate a number of clients 101–103 (e.g., personal computers, workstations, portable computers, minicomputers, terminals, etc.), upon which various processes are used to perform desired tasks by different groups or departments (e.g., inventory, payroll, billing, finances, etc.). The data relating to these various tasks can be entered, updated, and retrieved by any one of the clients 101–103 through one or more servers 107. Server 107 is comprised of a computer running a shared database management system (DBMS). A DBMS is a piece of software that manages access to a database. Basically, a database is a collection of related files containing data. The data is stored in one or more operational databases (DB) 104–106 (e.g., any of the conventional relational database management systems from Oracle, Informix, Sybase, Microsoft, etc.) residing within one or more high capacity mass storage devices (e.g., hard disk drives, optical drives, tape drives, etc.) A DBMS "mounts" a particular database in order to access tables of information contained within the files associated with that database. Thereby, data stored in the form of tables in a relational database residing in the databases 104–106 are accessible to any of the clients 101–103 via server 107. Different servers running different instances of a DBMS, can simultaneously access the same database.

In the present invention, one or more repositories residing within the mass storage device are created by either a client or a server. Basically, a repository is an abstraction for a database. The term "repository" is used to include operational database, data mart and data warehouse. Session information as well as mapping information relating to how data is to be mapped and transformed from sources of one or more operational databases to target tables of data marts or data warehouses is kept in a repository. Raw data stored in source tables residing within one or more source operational databases are extracted, transformed, and loaded into the appropriate target tables of designated data warehouses or data marts by standard, well-known extraction, transformation, and loading processes. It would be appreciated by those with ordinary skill in the art that the present invention may be practiced in conjunction with any number of different hardware and/or software configurations.

Figure 2:
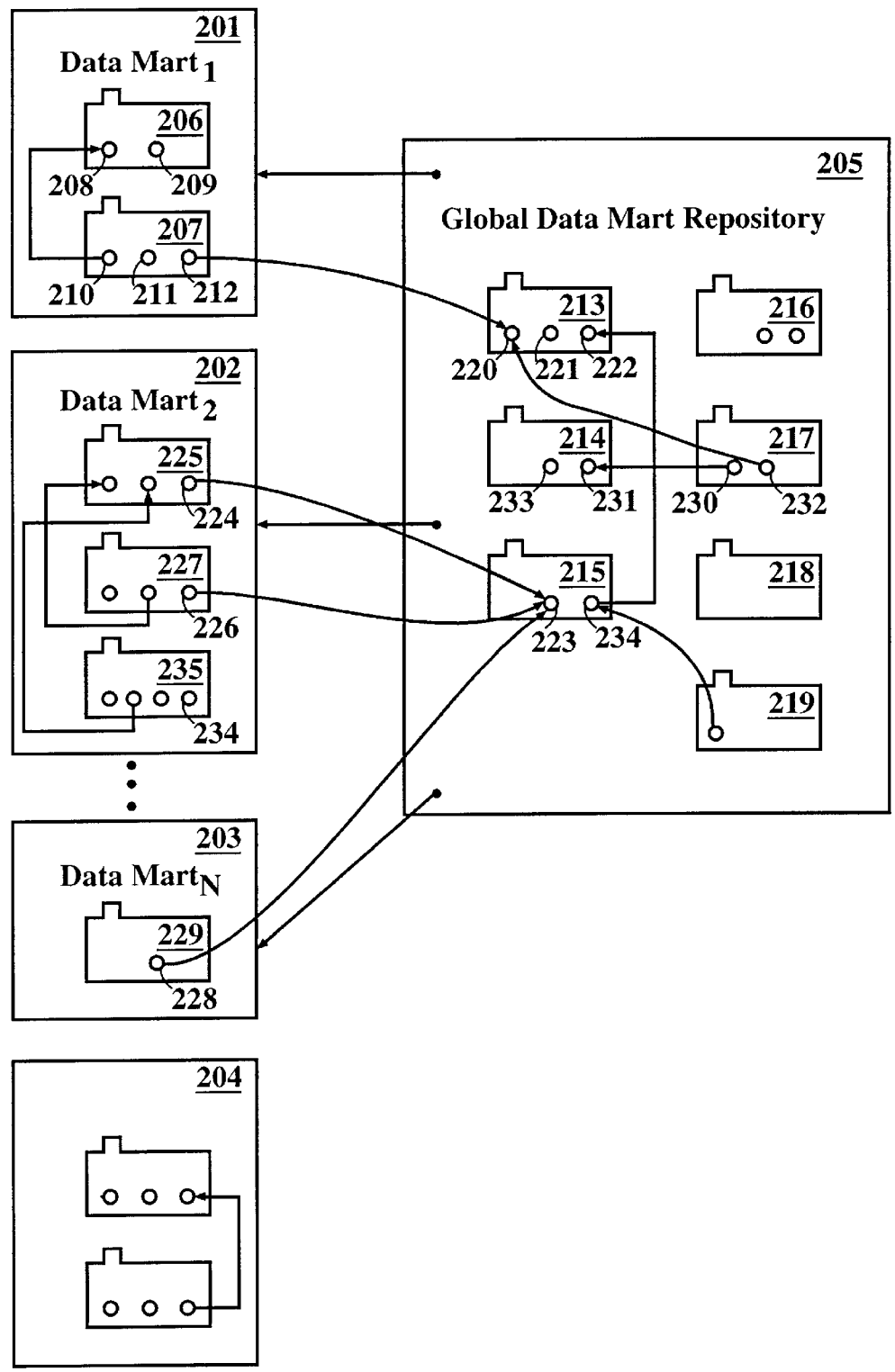
FIG. 2 shows a global data mart repository which is linked to a number of data marts.

The present invention provides the flexibility, autonomy, and ease of management associated with a distributed multiple data mart approach. With the present invention, any number of smaller repositories (e.g., data marts) can be created and tailored for specific users. In addition to these separate data marts, one Global Data mart Repository (GDR) are created so that metadata contained therein can be shared and reused between the various data marts. The sharing feature is accomplished by linking certain designated data marts with the Global Data mart Depository. Hence, there exist three different types of repositories: independent, linked, and global. These three different types of repositories, their functions, and interconnections are described with reference to FIG. 2. This figure shows a GDR 205 connected to a number of linked data marts 201–203. Data marts 201–203 are linked to GDR 205 (as represented by the arrows pointing from the GDR 205 to the data marts 201–203) so that the former can be recognized by the latter. By registering a repository with a GDR, the necessary link between the two repositories is established, and thereafter the linked repository is able to share metadata with other repositories linked to the same GDR.

Note that data mart 204 is not linked and thereby, remains independent. Hence, data marts 201–203 have the ability to share certain metadata residing within GDR 205, whereas independent data mart 204 lacks this ability.

The actual mechanism which allows for the sharing of metadata is through the use of "object references." In general, each of these repositories 201–205 contain one or more objects. An object is defined as the abstraction for representing fundamental data warehousing concepts, such as source definitions, target tables, and transformations. For a typical data warehousing problem, a number of source objects are defined to model the data obtained from the operational databases. Similarly, a number of target objects are created for representing the relational tables of the data warehouse/mart that receives the transformed data for analysis. The transformation objects, in turn, capture how the data should be transformed between various sources and targets. In turn, these objects are grouped into folders. A folder represents the abstraction for grouping related objects and metadata in a repository. Folders can be of type regular or shared. The content of a shared folder can be accessed by other folders in the same repository, and by other linked repositories if the shared folder is in a global data mart repository through the use of a "reference." A reference represents the abstraction for pointing to an object that resides in a shared folder within the same repository or in the global data mart repository.

Hence, an object reference provides the means for sharing or reusing an object, such as a source, target, or transformation, within or across repositories.

For example, data mart 201 contains a shared folder 206 and a regular folder 207. Shared folder 206 contains two objects 208 and 209 (objects are represented by circles), and regular folder 207 contains three objects 210–212. Object 208 is shared between folders 206 and 207 through the use of an object reference 210. Object reference 210 contains the address of object 208, thereby effectively acting as a pointer to the location of object 208. This is represented by the arrow from object 210 to object 208. In this example, GDR 205 contains three shared folders 213–215 and four regular folders 216–219. Shared folder 213 contains three objects 220–222. Object 220 is shared between folder 213 residing within GDR 205 and folder 207 residing within data mart 201. This sharing is made possible by an object reference 212 which points to object 220 of folder 213. This object reference is made possible because data mart 201 is linked to GDR 205. In addition, a single object within a shared folder of GDR can be shared by multiple folders in either the same data mart or belonging to different data marts linked to that GDR. Object 223 of folder 215 in GDR 205 is referenced to by object 224 of folder 225; by object 226 of folder 227; and by object 228 of folder 229. Folders 225 and 227 reside within data mart 202, whereas folder 229 resides within data mart 203. Furthermore, an object residing within a shared folder 213–215 of GDR 205 may be referenced by an object residing within one of the regular folders 216–219 of the GDR 205 (e.g., object 230 of regular folder 217 references object 231 of shared folder 214). The same shared object 220 within GDR 205 may be referenced by an object 212 residing in a folder outside of GDR 205 while simultaneously also be referenced by an object 232 residing within GDR 205. Note that some objects are not referenced. Object 234 of regular folder 235 stands by itself, and object 233 of shared folder 214 and object 224 of shared folder 225 might be reserved for future sharing.

In general, the present invention offers unprecedented flexibility because any number of different combinations and referencing is possible.

Figure 3:
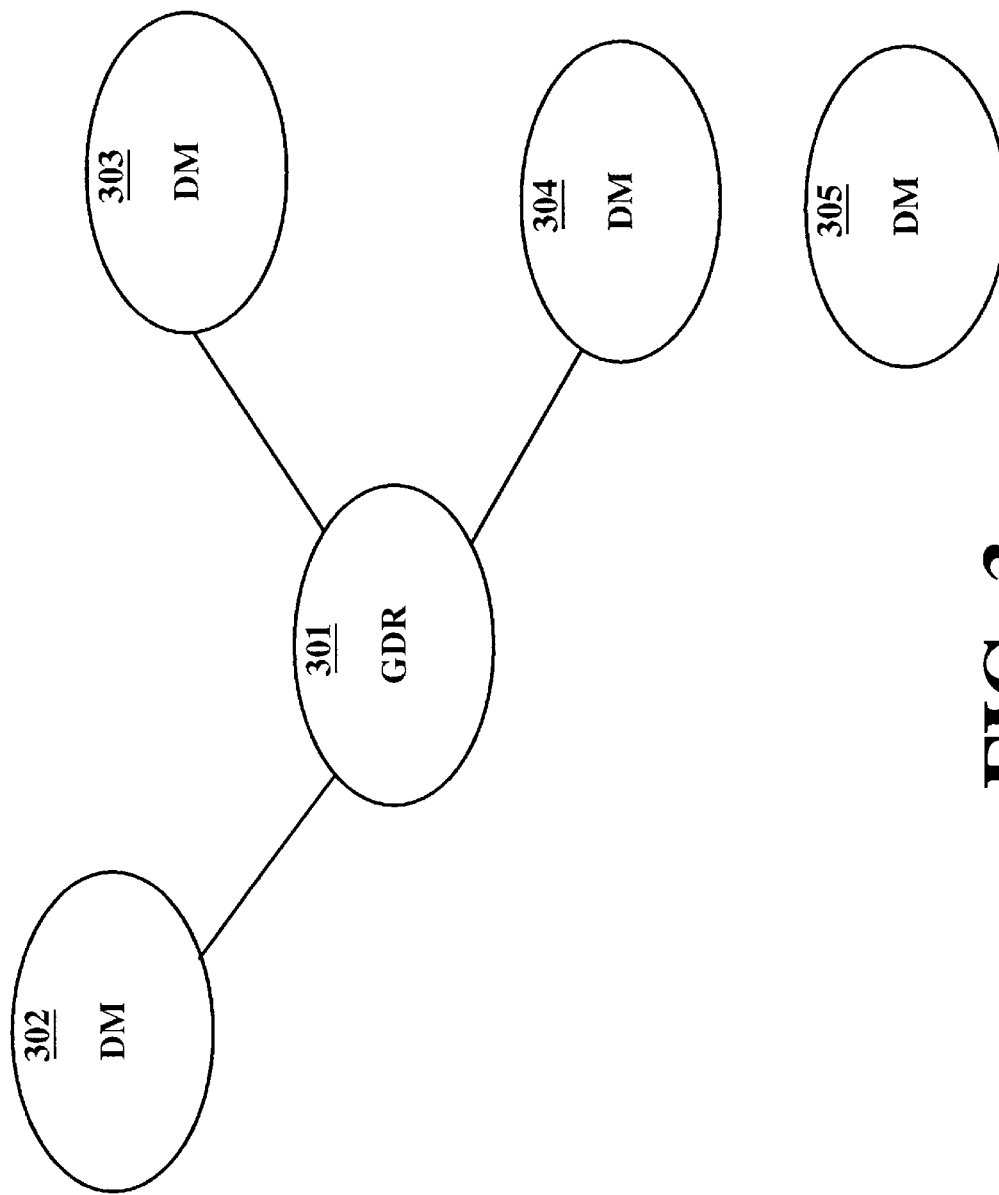
FIG. 3 is a diagram which shows a hierarchical GDR/data mart scheme which can be implemented with the present invention.

FIG. 3 is a diagram which shows a hierarchical GDR/data mart scheme which can be implemented with the present invention. Whenever one or more independent data marts grow to the size deemed to be too unwieldy or whenever it is desired to share metadata between two or more data marts, the corporate information technology (IT) administrator or someone with equivalent skills, will designate one of the data marts and convert it into a GDR. The other data mart(s) will then be linked to this new GDR. Alternatively, the IT administrator can create an original, new GDR. For example, GDR 301 can either be newly created or converted from a prior independent data mart. Other data marts 302–304 can be linked to GDR 301 so that metadata residing in shared folders can be shared and reused between GDR 301 and data marts 302–304. Note that one or more data marts 305 can remain independent from all of the other data marts and GDRs. In summary, any number of linked independent data marts, along with a global data mart repository with various linkings, and sharing arrangements can be created through use of the present invention.

Figure 4:
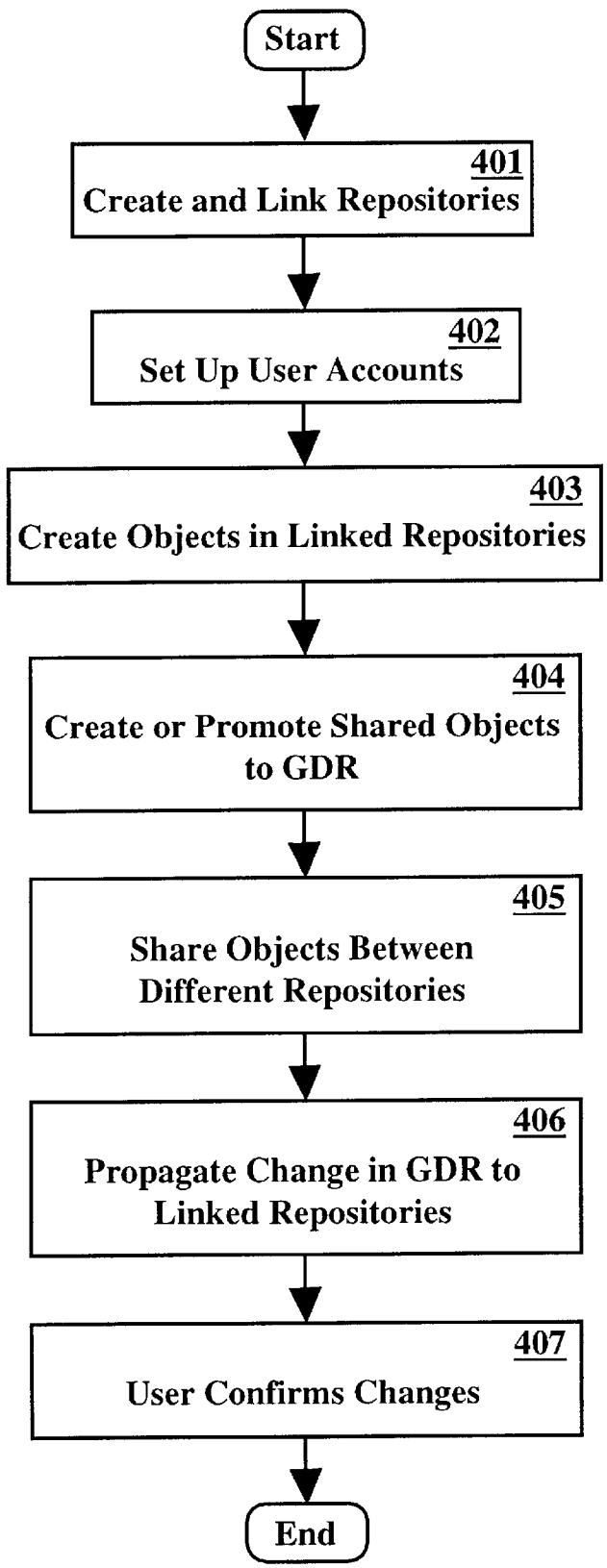
FIG. 4 is a flowchart describing the steps for implementing the shared metadata scheme of the present invention.

FIG. 4 is a flowchart describing the steps for implementing the shared metadata scheme of the present invention. Initially, an administrator creates multiple repositories and then links certain designated repositories, step 401. Next, the administrator sets up user accounts to grant specific access privileges to designated personnel and users, step 402. In step 403, one or more objects are created in the linked repositories. Selected ones of these objects to be shared are then promoted as shared objects to the GDR in step 404. Alternatively, shared object(s) can be created within the GDR. Once these shared objects are contained within the GDR, they can be accessed (e.g., shared or reused) by one or more of the linked repositories, step 405. Whenever a change is made to any objects in shared folders GDR, the change is automatically propagated to each of the repositories sharing that particular object, step 406. Finally, there is an optional step 407 which prompts the user to confirm or accept the update. Each of these steps are described in detail below.

Figure 5:
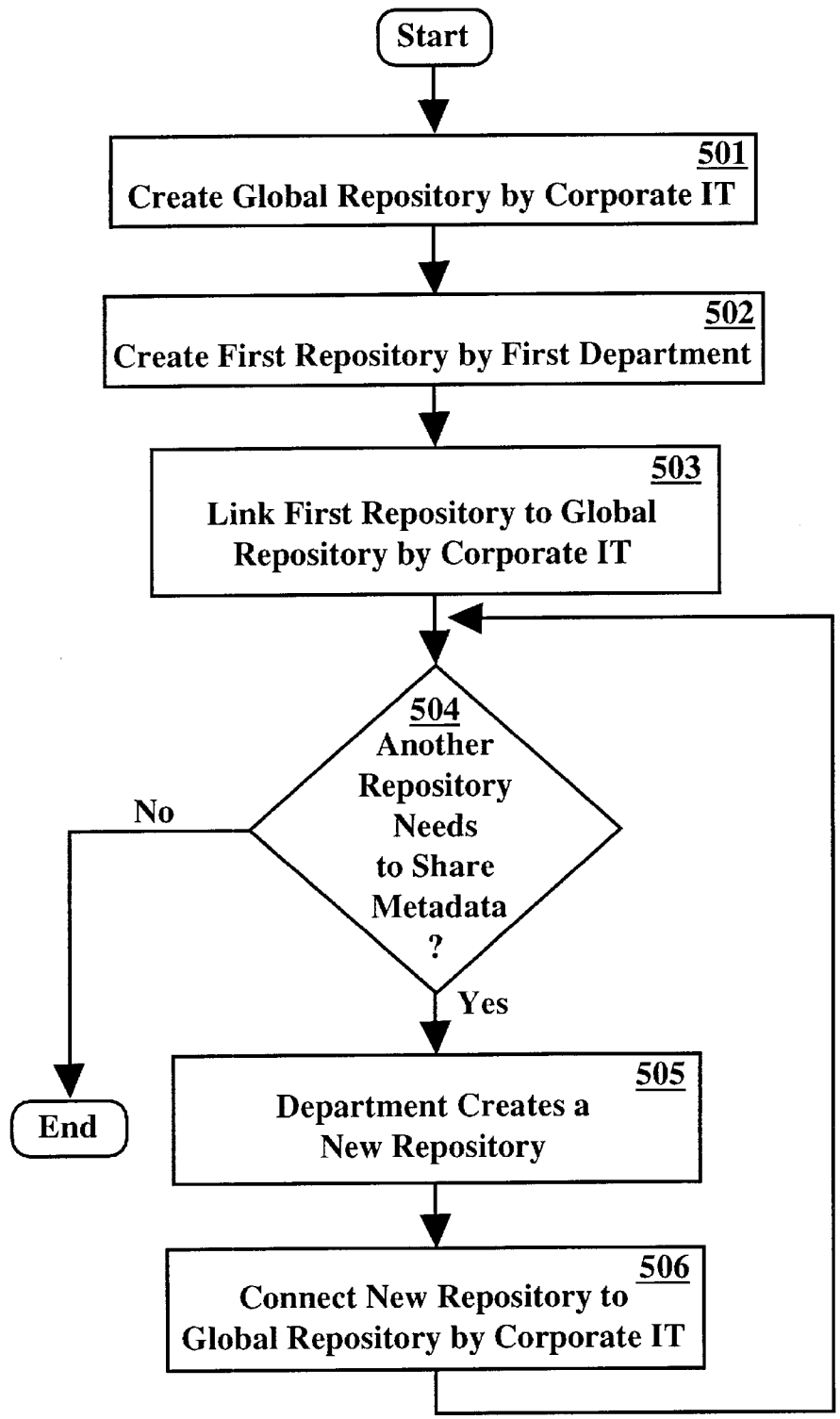
FIG. 5 is a flowchart describing the steps for creating and linking repositories.

FIG. 5 is a flowchart describing the steps for creating and linking repositories. Initially, a global repository is created by personnel or an administrator from the corporate information technology group, step 501. One of the departments (e.g., sales) creates its own repository in step 502. The corporate IT administrator then links the first "sales" repository to the global repository in step 503. In step 504, a determination is made as to whether other departments (e.g., marketing) desire to create their own repository or whether the first department (e.g., sales) wishes to create another repository. If another repository is desired or needed, the corresponding department then creates the new repository, step 505. It is the function of the corporate IT administrator to link the new repository to the global repository, step 506. If there are no more additional repositories to be added, the process is complete. Note, however, that this is an ongoing process. New repositories can be created and linked; old repositories may be removed or deleted.

Figure 6:
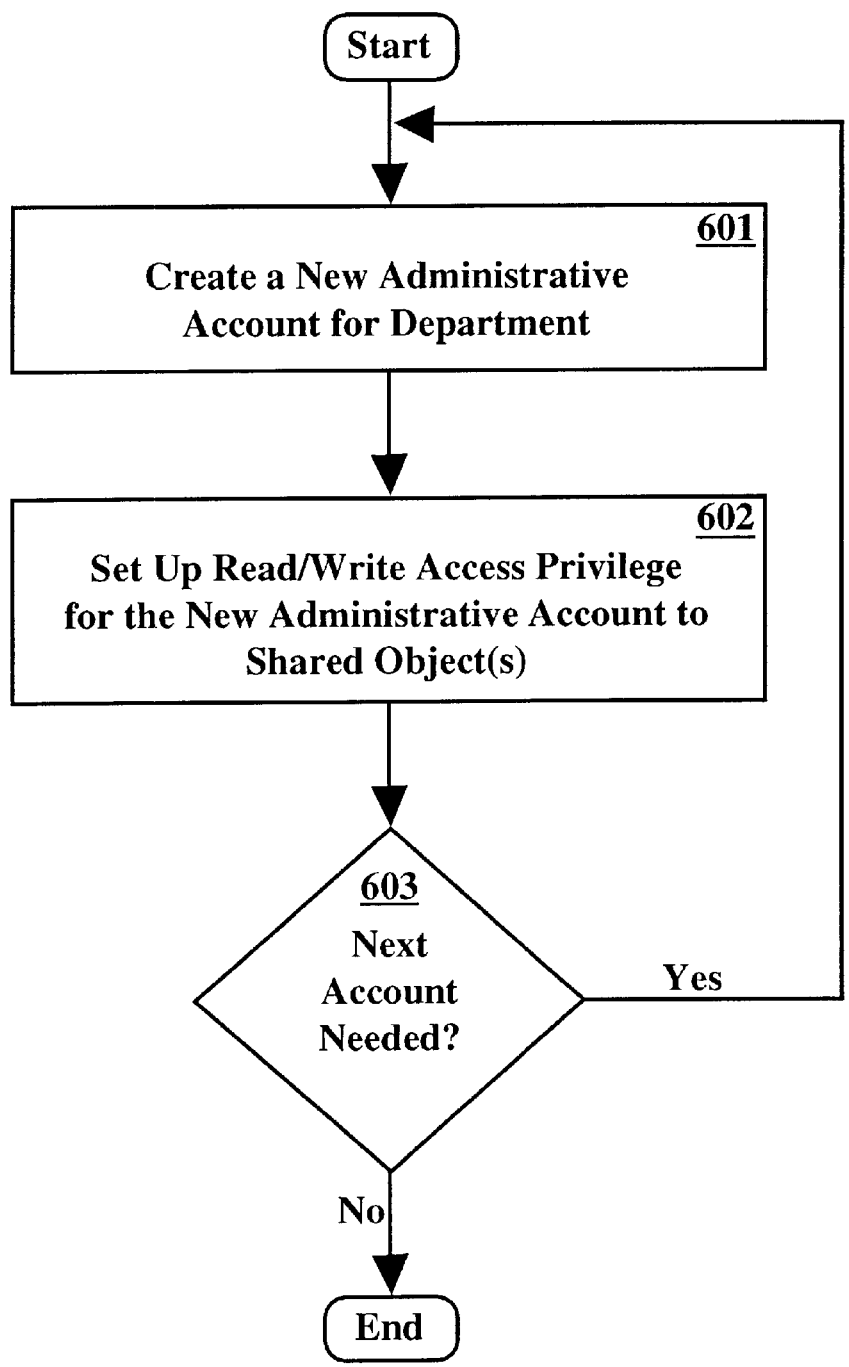
FIG. 6 is a flowchart describing the steps for setting up user accounts on the global repository.

FIG. 6 is a flowchart describing the steps for setting up user accounts on the global repository. Initially, a new administrative account is opened for the department associated with a first repository linked to the global repository. This new account specifies the privileges that person is entitled with respect to the shared objects/folders residing in the global repository, step 602. The different privilege levels include read only as well as read/write access. With read only access, the account holder can only read the shared object information. With read/write access, the account holder has the ability to not only read the information, but also to change it as well. Steps 601 and 602 are repeated for each new account that needs to be set up. Hence, for example, a sales person may have an account which allows read/write access privilege for a shared sales folder residing in the global repository. A marketing person may have an account which allows read/write access privilege for a shared marketing folder residing in the global repository. The sales folder contains metadata created by the sales department, and the marketing folder contains metadata created by the marketing department. If the sales person's account were to be given read privilege with respect to the marketing folder, any metadata residing within the marketing folder could be used and shared by the sales person.

However, the sales person may not change the metadata residing in the marketing folder; the sales person may only change the metadata residing in the sales folder. Likewise, if the marketing person's account were to be given read privilege with respect to the sales folder, any metadata residing within the sales folder could be used and shared by the marketing person. However, the marketing person may not change the metadata residing in the sales folder; the marketing person is restricted to changing only the metadata residing in the marketing folder.

Figure 7:
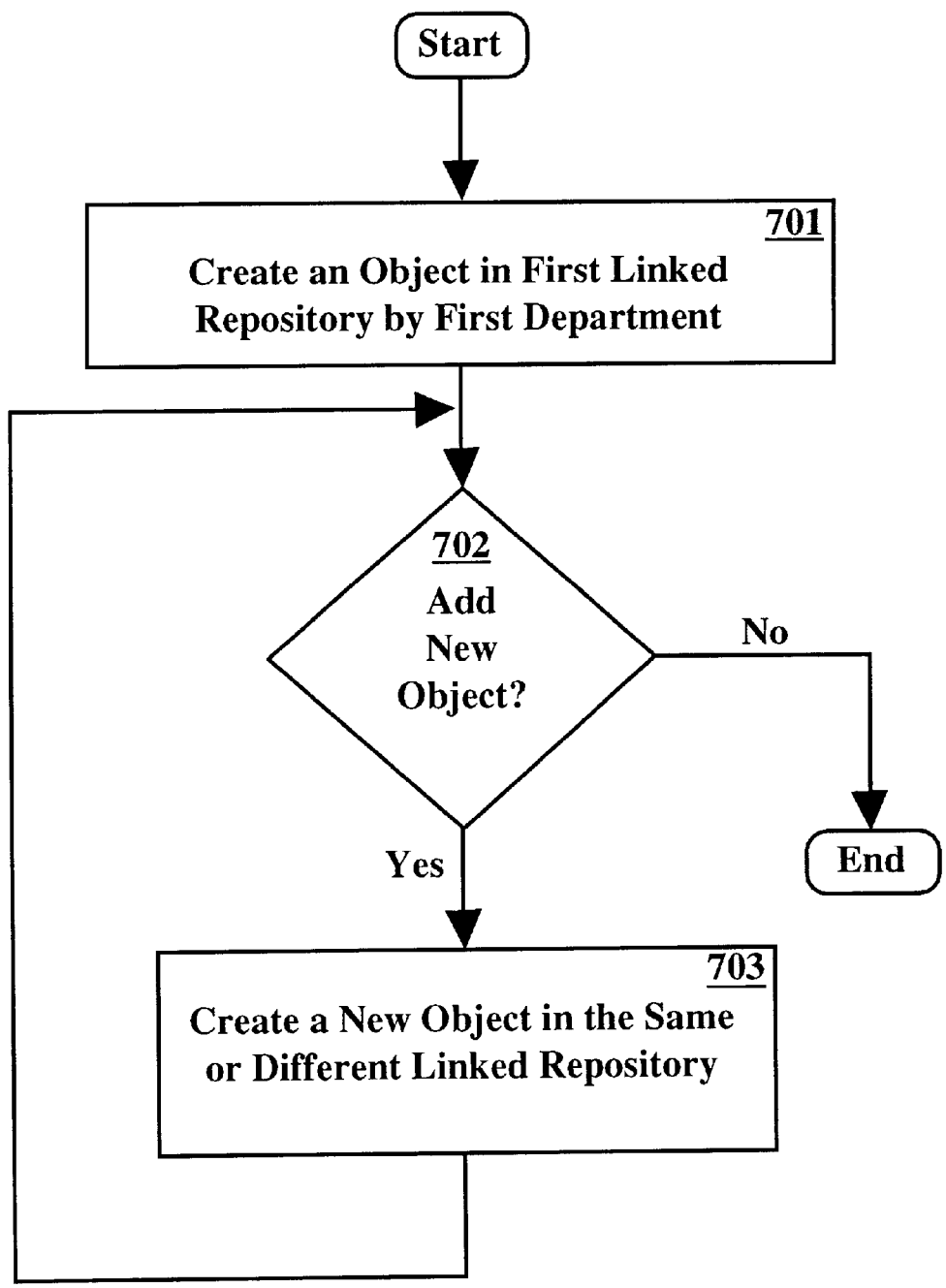
FIG. 7 is a flowchart describing the steps for creating objects in the linked repositories.

FIG. 7 is a flowchart describing the steps for creating objects in the linked repositories. Initially, one of the departments (e.g., sales) creates an object (e.g., a revenue forecast computation transformation) in one of its repositories which is linked to the global repository, step 701. Next, a determination is made in step 702 as to whether another object is to be added. If so, the associated department (e.g., marketing) may add a new object (e.g., a customer profile table) to those folders to which it has write access privilege, step 703. This process is ongoing, in that additional objects may be added, old objects may be deleted, or old objects may be changed at any time. Furthermore, the new object may be created and added directly to one of the global repository's shared folders, or the new object can be promoted to the global repository.

Figure 8:
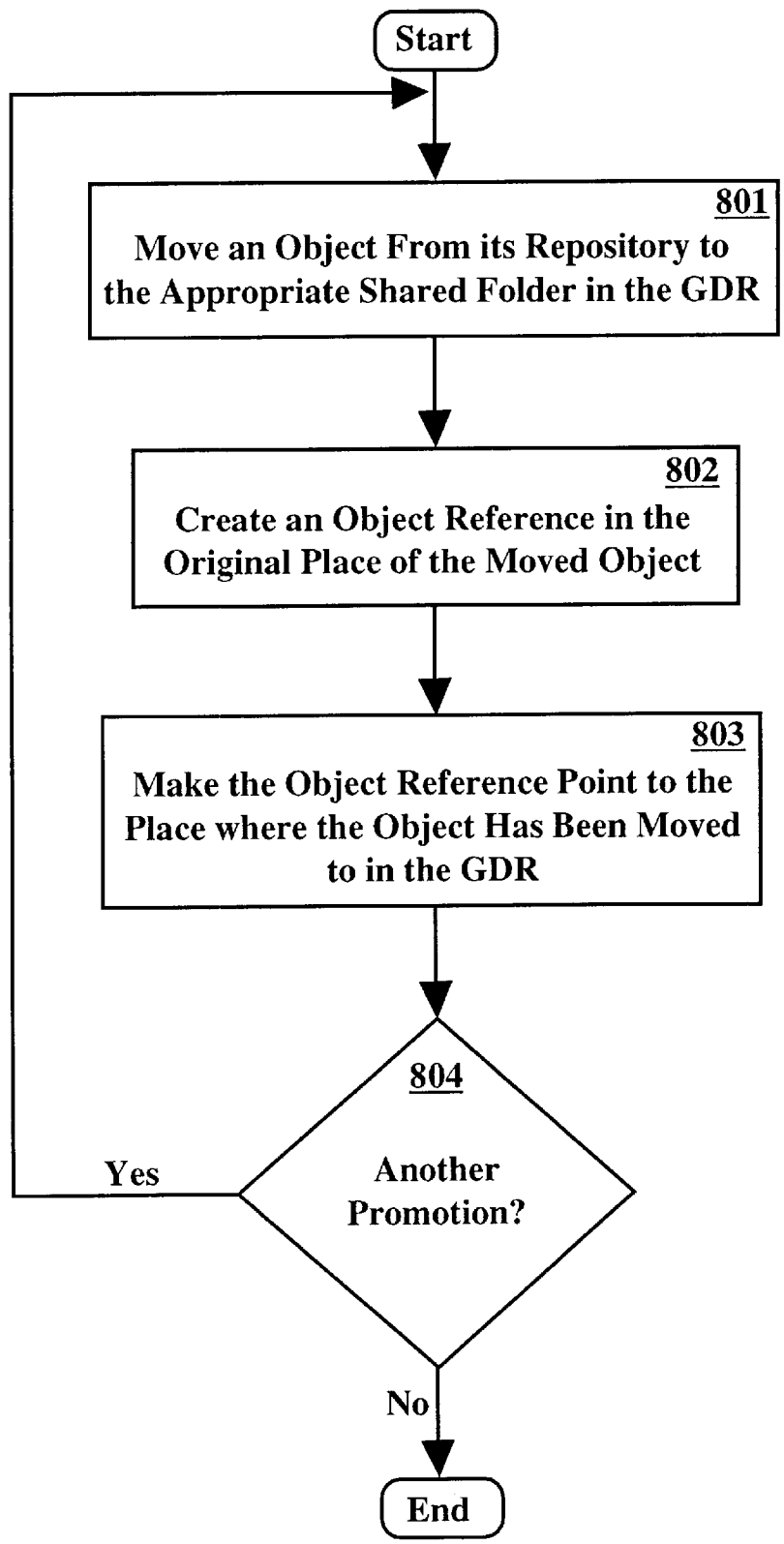
FIG. 8 is a flowchart describing the steps for promoting shared objects to the GDR.

FIG. 8 is a flowchart describing the steps for promoting shared objects to the GDR. First, the object to be promoted is moved from its repository to the appropriate shared folder in the global repository, step 801. Next, an object reference is put in the same location from whence the object had just been moved, step 802. The object reference is made to point to the new location of the object as it now resides in the global repository, step 803. These steps 801–803 are repeated for each object that is to be promoted, step 804. For example, the revenue forecast transformation object in the sales repository can be promoted to the GDR by moving (e.g., copying/deleting) it to the shared sales folder in the GDR. An object reference is then put in the location where the revenue forecast transformation object had been in the sales folder of the sales repository. The object reference points to (e.g., addresses) the revenue forecast transformation object in the shared sales folder of the GDR. Likewise, the customer profile table object in the marketing repository can be promoted to the GDR by moving (e.g., copying/deleting) it to the shared marketing folder in the GDR. An object reference is then put in the location where the customer profile table object had been in the sales folder of the marketing repository. The object reference points to (e.g., addresses) the customer profile table object in the shared marketing folder of the GDR.

Figure 9:
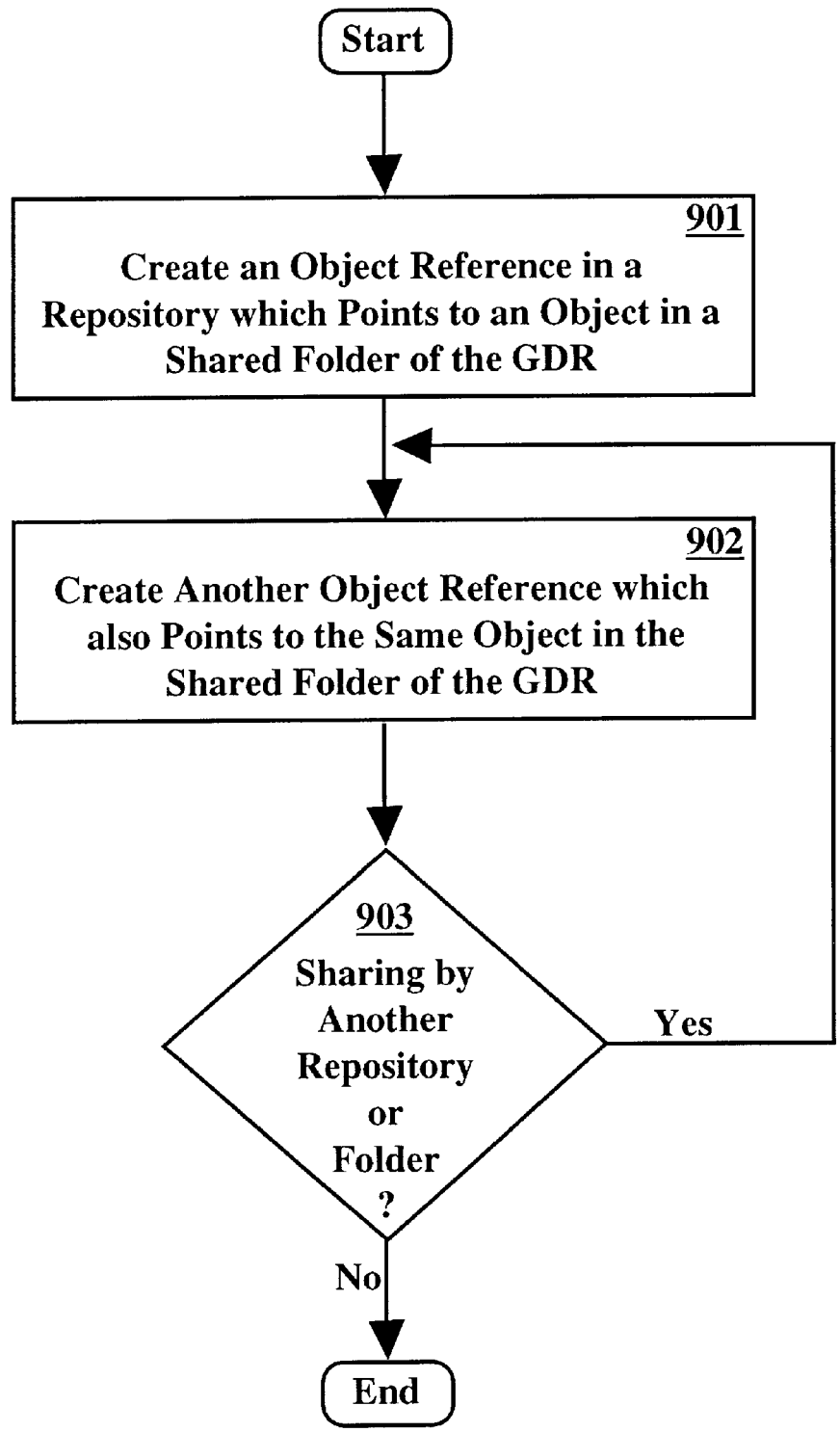
FIG. 9 is a flowchart describing the steps for sharing objects between different departments and/or repositories.

FIG. 9 is a flowchart describing the steps for sharing objects between different departments and/or repositories. In order to share an object residing in a shared folder of the GDR, a reference must be created to point to that object, step 901. The object reference is stored in the repository which desires to share that object. But to the user, it appears as if the object were indeed residing in his/her own repository instead of in the GDR. The accessing, referencing, and propagating processes all occur transparent to and without any intervention on the part of the user. Another object reference from either the same repository or a different repository can be created when the same or a different user desires to share that same object in the shared folder of the GDR, step 902. Indeed, any number of references can be created so that multiple users and/or repositories can share and use the same object found in the GDR, step 903. For example, a reference in the same repository can be created to point to the customer profile object in the marketing folder of the GDR. Likewise, a reference in the marketing repository can be created to point to the revenue forecast transformation object in the sales folder of the GDR.

Figure 10:
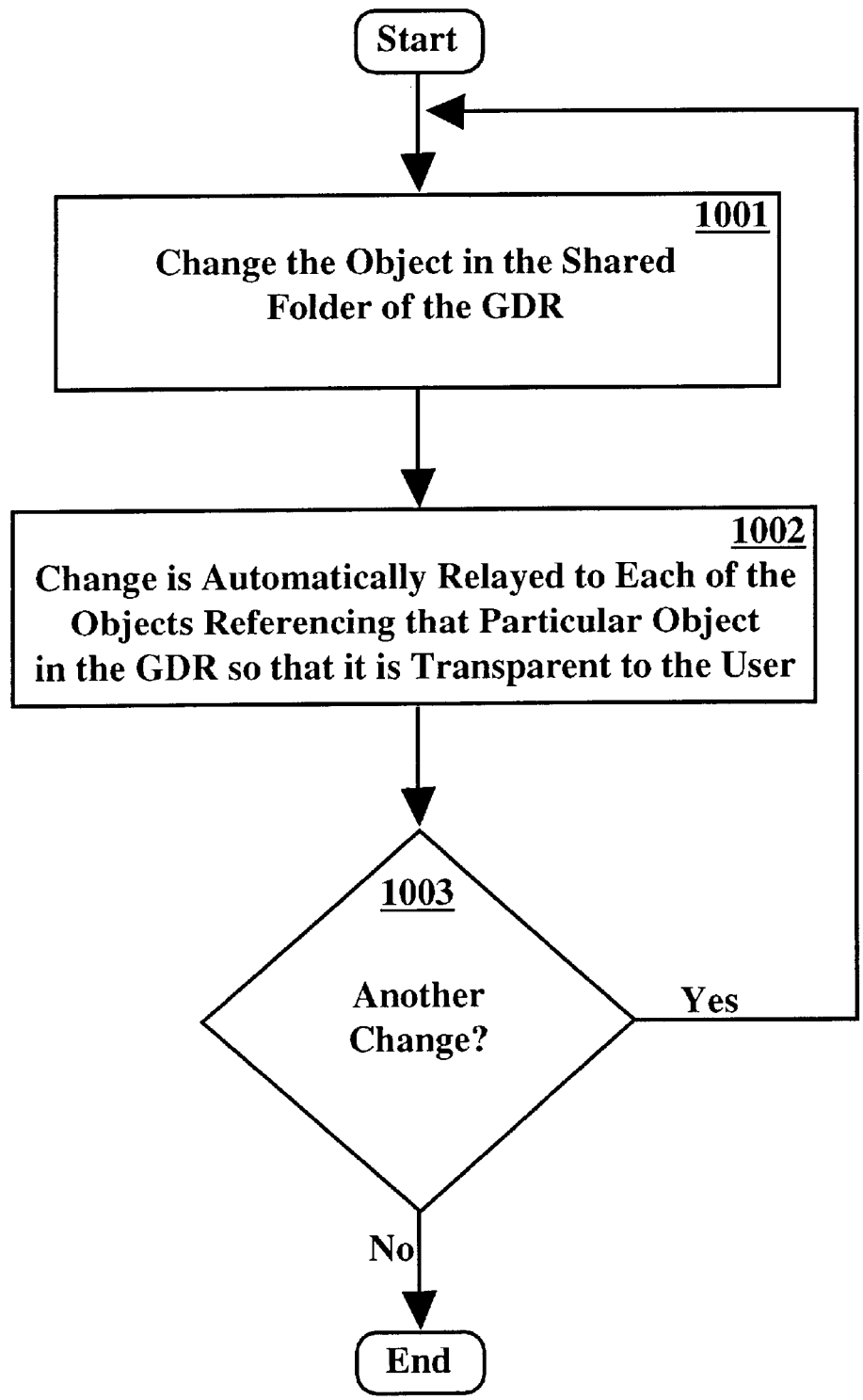
FIG. 10 is a flowchart describing the steps for propagating changes in the GDR to linked repositories.

FIG. 10 is a flowchart describing the steps for propagating changes in the GDR to linked repositories. There may be instances whereby a user desires to change one of the objects. In order to change a shared object, that user must have been assigned write privilege to do so. If the user has the requisite write privilege, he or she may then make the changes, step 1001. The change is then automatically relayed to each of the objects referencing that particular object in the GDR transparently to each of the user(s), step 1002. In other words, the users referencing that particular shared object do not have to take any action to effectuate the change made by another. Any number of changes may thusly be made, step 1003. As an example, assume that the sales person decides to make a modification to the revenue forecast transformation object in the sales folder of the GDR. The marketing person will automatically see/use the modified revenue forecast transformation object.

Figure 11:
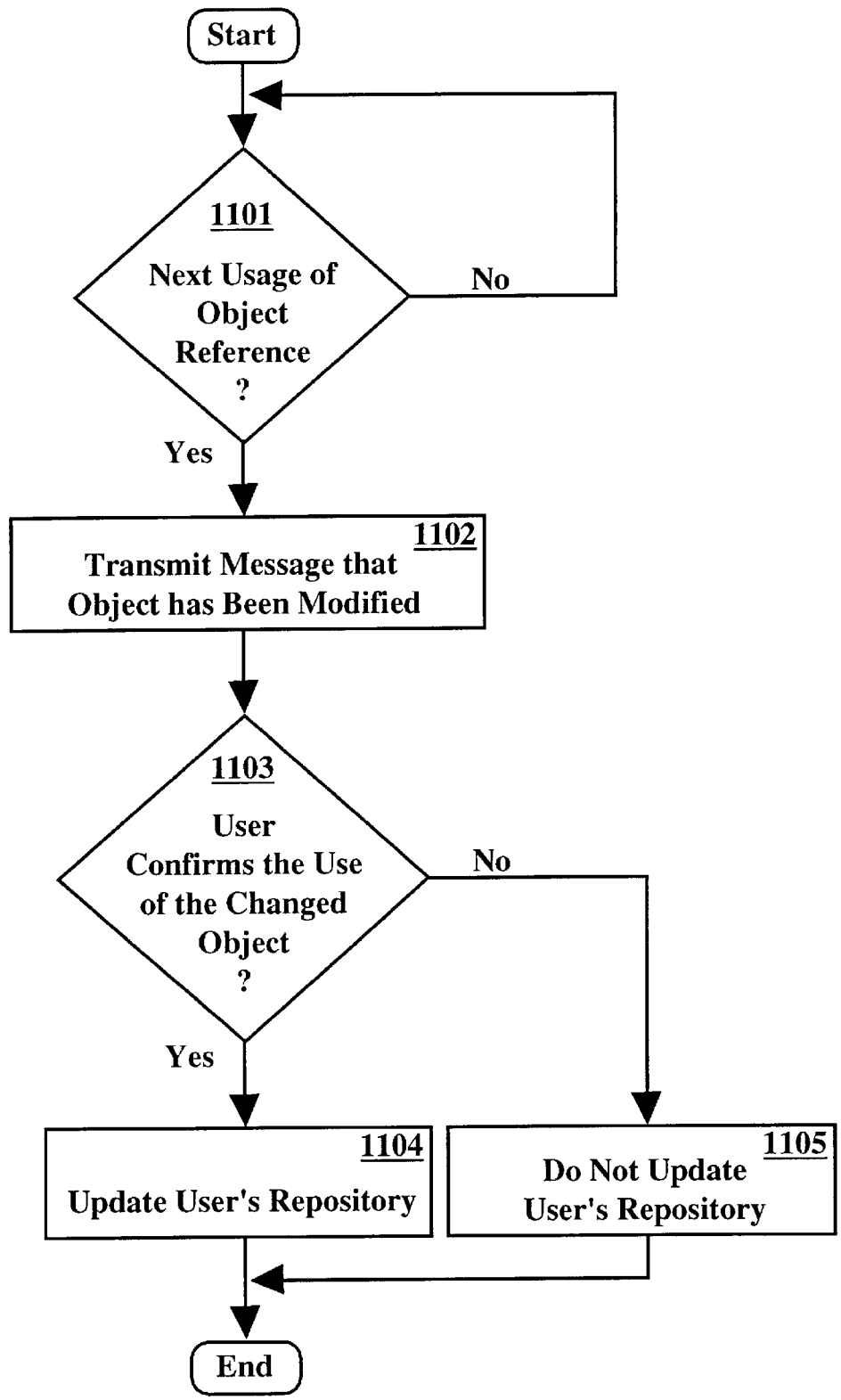
FIG. 11 is a flowchart describing the steps for user confirmation of any changes.

FIG. 11 is a flowchart describing the steps for user confirmation of any changes. In some instances, users referencing an object which has recently been modified might desire to be notified that the referenced object has been changed. In order to inform the user that a change has been made, the system transmits a message displayed to the user, on the next usage of the reference to the modified object, that the referenced object has been modified, steps 1101 and 1102. The user must then send a confirmation, step 1103. If the confirmation is received, the user's repository is updated, step 1105. Otherwise, the user's repository is not updated, step 1105. At this point, the user has many options: the user can delete that reference; the user can request that the modification be removed, improved, or otherwise changed again; the user can select a different reference; the user can create his/her own object; etc. Going back to the previous example, suppose that the revenue forecast transformation object were changed by sales. The next time marketing accesses/uses the revenue forecast transformation object, the computer system informs him/her that changes have been made to the metadata. In one embodiment of the present invention, the actual changes which were made, is displayed to the user. Upon confirmation, the marketing repository is updated to reflect the modification.

Figure 12:
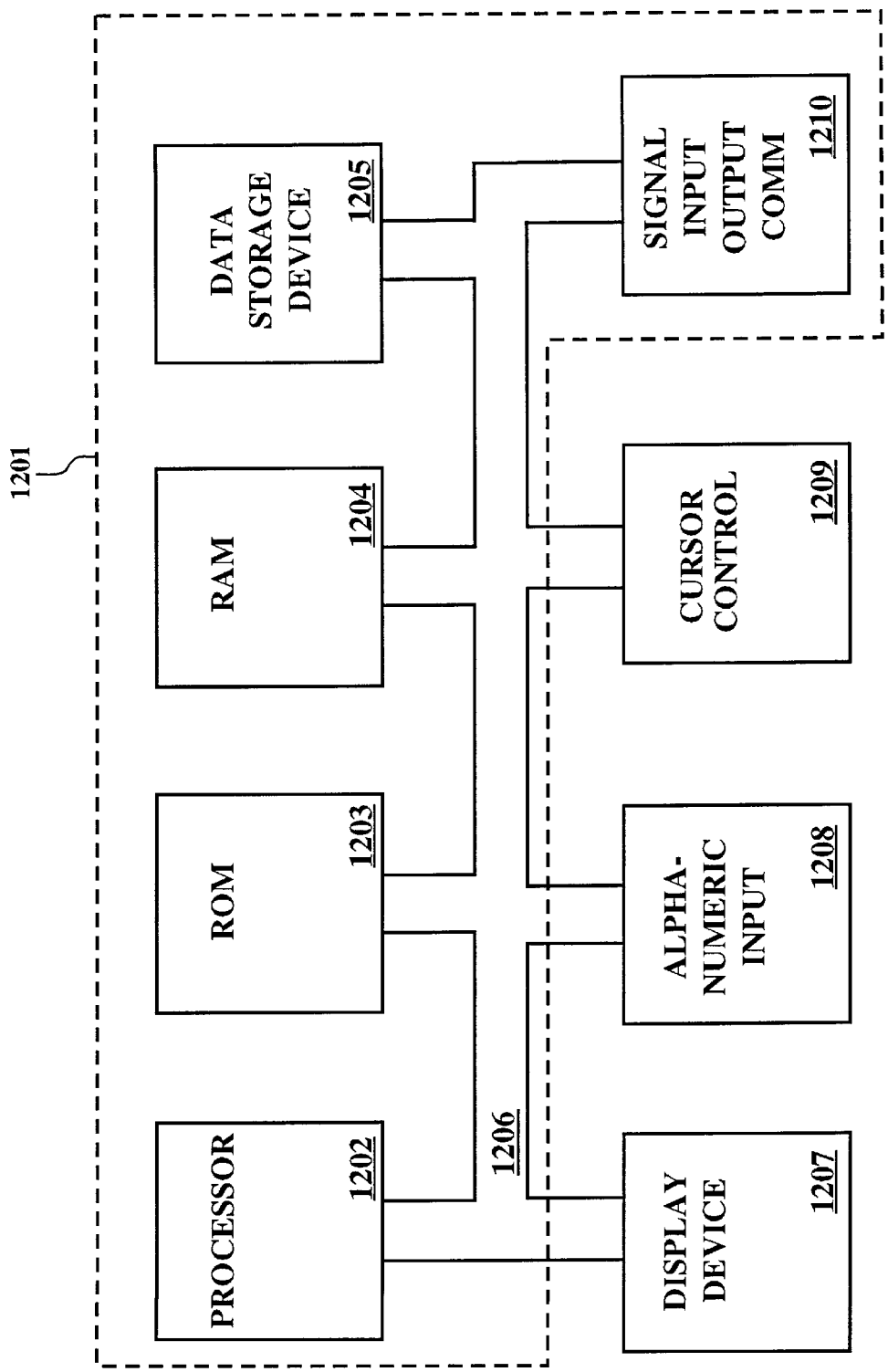
FIG. 12 illustrates an exemplary computer system upon which the present invention may be implemented or practiced.

FIG. 12 illustrates an exemplary computer system 1201 upon which the present invention may be implemented or practiced. It is appreciated that the computer system 1200 of FIG. 12 is exemplary only and that the present invention can operate within a number of different computer systems. Computer system 1200 of FIG. 12 includes an address/data bus 1206 for conveying digital information between the various components, a central processor unit (CPU) 1202 for processing the digital information and instructions, a main memory 1204 comprised of random access memory (RAM) for storing the digital information and instructions, a read only memory (ROM) 1203 for storing information and instructions of a more permanent nature. In addition, computer system 1200 may also include a data storage device 1205 (e.g., a magnetic, optical, floppy, or tape drive) for storing vast amounts of data, and an I/O interface 1210 for interfacing with peripheral devices (e.g., computer network, modem, mass storage devices, etc.). It should be noted that the software program for performing metadata sharing through object referencing can be stored either in main memory 1204, data storage device 1205, or in an external storage device. Devices which may be coupled to computer system 1200 include a display device 1207 for displaying information to a computer user, an alphanumeric input device 1208 (e.g., a keyboard), and a cursor control device 1209 (e.g., mouse, trackball, light pen, etc.) for inputting data, selections, updates, etc.

Thus, a method and apparatus for sharing metadata in a distributed environment via object referencing has been disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A database system for storing data, comprising:
    a global repository containing metadata;
    a shared folder residing within the global repository, wherein the shared folder contains metadata which is to be shared;
    a first data mart linked to the global repository;
    a reference residing within the first data mart, wherein the reference specifies a link to of the metadata in the shared folder of the global repository and a user accesses the metadata through the first data mart by using the reference to read the metadata residing in the shared folder.

2. The database system of claim 1 further comprising a user account stored in either the global repository or the data mart which grants the user privilege to read from and/or write to the metadata stored in the shared folder.

3. The database system of claim 1, wherein metadata is first created in the data mart and then promoted to the global repository.

4. The database system of claim 1 further comprising:
    a second data mart linked to the global repository;
    a second reference pointing to the metadata residing within the global repository, wherein a first user has access to the metadata through the first data mart by the first reference and a second user has access to the metadata through the second data mart by the second reference.

5. The database system of claim 1, wherein a change made to the metadata stored in the global repository is propagated to the first data mart.

6. The database system of claim 1, wherein if the metadata is changed, a message is transmitted to the user indicating that the metadata has been modified.

7. A method for sharing metadata between a plurality of databases, comprising the steps of:
    creating a first database comprised of a global data mart repository for storing the metadata that is to be shared;
    creating a second database comprised of a data mart;
    linking the second database to the first database;
    creating a reference which specifies a link to where the metadata is stored in the first database;
    storing the reference in the second database;
    accessing the metadata by using the reference.

8. The method of claim 7 further comprising the step of promoting metadata from the data mart to the global data mart repository.

9. The method of claim 8 further comprising the steps of creating another data mart having a reference to the metadata of the global data mart repository, wherein both data marts have access to the same shared metadata stored in the global data mart repository.

10. The method of claim 9 further comprising the steps of:
    a first user changing the metadata stored in the global data mart;
    providing a second user with updated metadata when the second user accesses the metadata, wherein the metadata is updated automatically and transparently to the second user.

11. The method of claim 10, wherein the global data mart repository was created from a pre-existing data mart.

12. The method of claim 10 further comprising the step of creating a plurality of user accounts which specify access privileges for a plurality of users with respect to the metadata stored in the global data mart repository.

* * * * *